3,085,049
PROCESS FOR PRODUCING VITAMIN $B_{12}$
AND ANTIBIOTICS
Hermann Rudy, Heidelberg, Johann Rauch, Mannheim, Karl Rolf Dietrich, Frankfurt am Main, and Christa Constabel, Heidelberg, Germany, assignors to Joh. A. Benckiser G.m.b.H. Chemische Fabrik, Ludwigshafen (Rhine), Germany, a corporation of Germany
No Drawing. Filed Sept. 28, 1960, Ser. No. 58,892
Claims priority, application Germany Oct. 13, 1955
5 Claims. (Cl. 195—80)

The present invention relates to a highly valuable and effective culture medium for the production of vitamin $B_{12}$ and/or antibiotica by fermentation of molds, bacteria and other microorganisms and more particularly to a nutrient medium which is especially adapted for growing such molds, bacteria and the like, and to a process of producing vitamin $B_{12}$ and/or antibiotica from such molds, bacteria and other microorganisms and of preparing such a culture medium.

The present invention is a continuation-in-part of copending application Serial No. 615,018, filed October 10, 1956, now abandoned, and entitled "Process for the Treatment of Molasses Slops With Microorganisms."

Heretofore, many attempts have been made to utilize the slurries or slops of molasses fermentation processes in various ways. Thus, for instance, they have been utilized as a growth-promoting nutrient for yeast. But this process is rather uneconomical because it requires addition of large amounts of sulfuric acid in order to maintain the required acid pH-value in the slurries. The organic acids initially present in said slurries, wherein they have been set free from organic salts, are consumed by the growing yeast so that the pH-value would change towards an unsuitable alkaline pH-value if no sulfuric acid were added.

A number of microbiological processes for the preparation of vitamin $B_{12}$ and/or of antibiotics have been described in the prior art. These processes make use of various microorganisms which are capable of synthesizing vitamin $B_{12}$ and/or antibiotica. For instance, a strain of *Streptomyces olivaceus* can be used for the production of vitamin $B_{12}$ which strain is cultivated on various protein-containing culture media with agitation and aeration. Strains of *Streptomyces aureofaciens* have been employed for the production of chlortetracycline, or of *Streptomyces viridifaciens* for the production of tetracycline, or of *Streptomyces rimosus* for the production of oxytetracycline. Other antibiotics are also produced by fermentative processes on suitable nutrient media. Such known processes, however, require relatively costly nutritive materials. Propionic acid bacteria have also proved to be useful in the production of vitamin $B_{12}$. However, in order to grow propionic acid bacteria for the formation of vitamin $B_{12}$ either synthetic culture media or complicated composition or relatively expensive natural nutrition materials, such as molasses solutions or inverted molasses solutions must be used.

It is one object of the present invention to provide a simple and effective process for cultivating propionic acid bacteria which are capable of producing vitamin $B_{12}$, which new process requires relatively inexpensive nutritive materials.

Another object of the present invention is to provide an inexpensive, highly effective culture medium for cultivating propionic acid bacteria.

Still another object of the present invention is to provide a simple and effective process of isolating substantially pure vitamin $B_{12}$ from such inexpensive culture media of propionic acid bacteria.

A further object of the present invention is to provide a highly nutritious animal feed supplement.

A further object of the present invention is to provide a highly effective culture medium for producing vitamin $B_{12}$ and/or antibiotics by fermentation of microorganisms capable of producing such active agents, such as molds and bacteria.

A further object of the present invention is to provide a highly effective nutrient medium for the production of vitamin $B_{12}$ by fermentation with *Streptomyces olivaceus*.

A further object of the present invention is to provide a simple and effective process of preparing such valuable culture media.

Other objects of the present invention and advantageous features thereof will become apparent as the description proceeds.

It has been found that the demanding and rather fastidious propionic acid bacteria can be cultivated with the formation of vitamin $B_{12}$ on molasses slops, slurries, run-offs, and the like residues when fungal mycelium or the growth or crops of other microorganisms, such as bacteria, or their autolysates, hydrolysates, plasmolysates, or thermolysates, are added to such a culture medium. The use of propionic acid bacteria has the advantage that the cultivating medium, during fermentation, gradually becomes acid due to the formation of propionic acid and that for this reason infection by foreign microorganisms is avoided. Such contamination, for instance, with other microorganisms would seriously interfere with normal fermentation procedure. As propionic acid bacteria fermentation can be carried out under anaerobic conditions, aeration and intensive agitation can be dispensed with, and a considerable saving of energy and expense is thus achieved.

The reduced danger of infection during anaerobic propionic acid fermentation is also due to the fact that calcium propionate formed thereby has a bacteriostatic and fungistatic activity without having a toxic effect.

Evaporation to dryness of the culture medium yields a valuable animal feed. The presence of calcium propionate in such animal feed protects the feed against infection by detrimental microorganisms which have a decomposing effect thereon. As a result thereof admixture of animal feed obtained according to the present invention to other feed materials imparts thereto a prolonged stability. Although the salts of propionic acid have a growth inhibiting effect on microorganisms which are capable of spoiling and decomposing the feed, they do not affect the animals fed with such materials. This is a further advantage inasmuch as no additional conventional preservative agents which frequently have a harmful effect need be added. The culture liquid as well as the bacterial culture may also be worked up to vitamin $B_{12}$ according to known methods. Such methods are, for instance, disclosed in U.S. Patents Nos. 2,595,159 and 2,582,589; British Patents Nos. 675,414 and 670,860; German Patents Nos. 912,743; 932,489; 897,316; and 947,193; or by H. Gaden in "Chem. Eng.," vol. 159 (April 1956); I. Gillen, "Chem. Eng. Progr.," vol. 51, page 547 (1955); C. L. Mantell, "Adsorption," McGraw-Hill Book Co., New York (1951); R. E. Treybal, "Liquid Extraction," McGraw-Hill Book Co., New York (1951); D. W. Anderson and E. F. Lau, "Chem. Eng. Progr.," vol. 51, page 507 (1955); and others.

According to the above mentioned copending application Serial No. 615,018 slops, slurries, runoffs, or the like residues from molasses fermentation processes can readily be utilized for preparing culture media for cultivating microorganisms by adding thereto the mycelium of molds and/or the growths or crops of other microorganisms, preferably after degrading the mycelium or growth, for instance, by subjecting it to autolysis, thermolysis, plasmolysis, cytolysis, hydrolysis, or the like treatment. The thermolysis usually takes place during the sterilisation of the molasses-slops. Addition of the thus treated mycelium or growth to the molasses residues yields a culture medium which has a remarkable growth promoting effect upon microorganisms cultivated thereon. Such a culture medium mixture of molasses residue and mycelium or growth from various fermentation processes such as citric acid or gluconic acid fermentation and the like, permits utilization of the molasses residues as well as of the mycelium or growth, i.e., of undesirable and practically useless waste products. For instance, the culture medium comprising molasses residue and the mycelium from the citric acid fermentation may be used for cultivating vitamin $B_{12}$-forming microorganisms such as Streptomyces olivaceus. The resulting culture can directly be employed, after drying, as animal feed supplement. Similar products are obtained by cultivating antibiotic-producing molds on such a culture medium, for instance, Streptomyces aureofaciens which also yields a highly nutritive feed supplement.

Unexpectedly superior results, however, are obtained when cultivating species of the genus Propionibacterium on such culture media. As pointed out hereinabove, this is quite unexpected because bacteria of said genus are difficult to cultivate and require complicated synthetic culture media.

It has furthermore been found that no additional carbohydrates or only very small amounts thereof need be added to the nutrient medium according to the present invention when using the same for growing propionic acid bacteria thereon. It is quite surprising that the bacteria take their carbon requirements from the proteins present in the molasses liquor and the mold mycelium without any decrease in vitamin $B_{12}$ production. Another surprising advantage thereby is a rather considerable reduction in fermentation time.

The used of mycelium as main nutrient in the anaerobic fermentation of propionic acid bacteria has the further advantage that the mycelium is enzymatically degraded and thus rendered better absorbable by the animal gastrointestinal tract. Furthermore, addition of the preferably pretreated mycelium permits to produce cultures of a rather high concentration of solid assimilable material so that subsequent thermal concentration and drying is considerably facilitated.

Not only distiller's wash but also molasses residues from other fermentation processes may be used, such as the runoffs obtained in the microbiological manufacture of gluconic acid, the molasses slurries from the yeast or citric acid production, the runoffs from the anaerobic methane fermentation of molasses, the molasses slurries from the lactic acid and the gluconic acid fermentation, and others. As is known, the organic matter of molasses is decomposed to about 50% in such methane fermentation, whereby, however, substantially no nitrogen is lost. As a result thereof, such slurries are particularly suitable as ingredients for nutrient media for microorganisms according to the present invention due to their high nitrogen content and the content of trace elements.

The mycelium admixed to such molasses residues is preferably used in autolyzed, thermolyzed, plasmolyzed, cytolyzed, or hydrolyzed form. Such degradation of the mycelium may be effected in various ways depending upon the microorganism used in the production of the mycelium. Frequently sterilization is sufficient to cause such degradation. In other instances autolysis or plasmolysis must be effected in place of such thermolysis. In some cases, for instance, when using the mycelium of Aspergillus, hydrolysis is the preferred degradation procedure. On simple autolysis of such a mycelium the cell walls of said microorganism remain substantially intact and only the contents of the cells are utilized for cultivation whereas hydrolysis affects also the cell walls and converts them into valuable nutrients. It was found that the degradation products of these cell walls provide particularly effective nutrients for the culture of microorganisms. For instance, Lactobacillus bifidus grows much better on a hydrolysate than on an autolysate of a yeast.

Partial or complete hydrolysis can be carried out in an acid or alkaline medium. The concentration of the acid or alkaline solution can be varied within a wide range, whereby lower concentrations of said chemical reagents are employed when operating at higher temperatures than at lower ones. Hydrolysis can be carried out in an open vessel or a closed one. It is, of course, understood that it should not be carried out too far so as to avoid complete decomposition of the nutrients. For instance, the mold mycelium obtained on fermentation to citric acid, gluconic acid, itaconic acid or in the manufacture of penicillin or other antibiotics such as chlortetracycline from Streptomyces aureofaciens, oxytetracycline from Streptomyces viridifaciens, streptomycin from Streptomyces griseus, or others, are preferably subjected to hydrolysis.

In some specific instances, for instance, in the case of the growth or crop of microorganisms the degradation of which is rather difficult, it is advisable to cause degradation of such microorganisms by cytolysis, i.e., by the action of specific organisms, whereby the mass is at the same time stirred and, if necessary, aerated.

It could not be foreseen that all kinds of molasses residues, slops, slurries, runoffs, and the like would also be suitable for the cultivation of vitamin $B_{12}$-producing microorganisms, because yeasts represent specific types of microorganisms and undergo specific kinds of metabolic processes not encountered with other microorganisms. It is also quite unexpected that the slops, slurries, or runoffs of molasses can be used for this purpose, as they are byproducts of the fermentation industry and contain only small amounts of assimilable nitrogen, because most of it has been consumed during fermentation, so that only difficultly assimilable betaine-nitrogen remains in the slurries. However, such residual nitrogen which is still present in the slurries is assimilated to a large extent by bacteria, actinomycetes, hyphomycetes, or other fungi as well as by algae.

If required, nutritive salts and/or trace elements may also be added to the culture medium according to the present invention.

The following examples serve to illustrate the present invention without, however, limiting the same thereto.

Example 1

400 kg. of the mycelium of Aspergillus niger from citric acid fermentation are ground and mixed with 8,000 l. of molasses slurry (containing about 10% of dry solids and about 1.2% of invert sugar). The mycelium was obtained before precipitation of citric acid in the process of microbiologically producing citric acid. The pH value of the mixture is adjusted to a pH of 7.5 by the addition of milk of lime (calcium hydroxide). 80 kg. of calcium carbonate (about 1% of the medium) are added to buffer the acid formed during fermentation. The nutrient solution is sterilized at 100° C. for one hour while stirring slowly. After cooling to 30° C. the medium is pumped into a fermenter provided with a slow stirrer and is inoculated with 2,000 l. of a 24 hour-old culture of Propionibacteriaum shermanii from an intermediate fermenter.

This inoculated material was obtained from three successive fermentation steps of 20 l., 200 l., and 2,000 l. The nutrient solution in the prefermenters and the intermediate fermenter differs from that of the production cultivation step only by a lower content of calcium carbonate, i.e. by a calcium carbonate content of 0.2%. Cultivation of the propionic acid bacteria requires 24 hours in each step whereupon the fermentation medium is transferred to the next-larger stirring vessel under sterile conditions.

In the production of fermenter of a capacity of 12 cu.m. the fermentation solution is agitated at slow speed. The speed of stirring is preferably between 30 revolutions per minute and 60 revolutions per minute so that about 6 mg. of oxygen are absorbed by one liter of culture liquid per hour. The pH value decreases to a pH of 5.5 during cultivation and fermentation. After 96 hours the fermentation liquid together with the bacteria cells contain 1.2 mg. of vitamin $B_{12}$ per liter.

The entire cultivation mixture is then concentrated by evaporation in a vacuum at a temperature of 70° C. to sirupy consistency and is finally evaporated to dryness by spray drying in a drying tower. 1,200 kg. of a powder containing 10 mg. of vitamin $B_{12}$ per kg. are obtained. This product can be used as a growth-promoting feed supplement.

To initially adjust the culture medium to a pH of 7.5, there may be used other alkaline substances than milk of lime, such as sodium hydroxide, sodium carbonate, ammonia solution, ammonium carbonate, potassium hydroxide, and the like.

To neutralize the organic acids formed by the action of the propionic acid bacteria, other alkaline substances, such as alkali metal hydroxides, alkaline earth metal hydroxides, or ammonium hydroxide can be used in place of calcium carbonate. Said agents may be continuously added in the form of solutions or suspensions during the course of fermentation. Thereby, the pH value should be maintained at a pH between 5.5 and 7.0. Other species of the genus Propionibacterium may be used in place of *Propionibacterium shermanii*, for instance, *P. freudenreichii*, *P. zeae*, *P. petersonii*, *P. pentosaceum*, and the like.

The process described hereinabove can also be varied in other ways without decreasing the yield of the vitamin $B_{12}$. For instance, the proportion of fungus mycelium to molasses residue may be varied over fairly large limits. Furthermore, the quantity of intermediate culture used for inoculation may differ considerably from the quantity mentioned hereinabove. The quantities may vary between 5% and 35% whereby with larger amounts of inoculating material cultivation and fermentation of the propionibacterium proceeds more rapidly and contamination by foreign organisms is more assuredly avoided.

Not only stirrers but also pumps, stirring rakes and the like agitating devices may be used for slow mixing and any known type of fermenter may be employed.

As is known, the molasses residues will vary somewhat in their content of sugar, nitrogen, and mineral salts. Such variations in composition are due to their origin and the manner in which prior fermentation was carried out. To compensate for such differences and to ensure uniform and consistent results in vitamin $B_{12}$ formation, suitable nutrients and activating agents for the propionic acid bacteria can be added, such as fish meal, starch hydrolysates, whey, diammonium phosphate, yeast autolysate, concentrates of B-vitamins, and the like. Known precursors and vitamin $B_{12}$ formation promoting agents, such as o-phenylene diamine and/or cobalt salts, can be added.

It is, of course, also possible to isolate vitamin $B_{12}$ and/or the antibiotics in the substantially pure state from such cultures whereby methods known per se are employed.

*Example 2*

40 kg. of washed and comminuted mycelium from *Aspergillus niger* and 200 l. of molasses residue from the production of citric acid are mixed with 50 l. of whey, 0.25 kg. of diammonium phosphate, and 2.5 kg. of calcium carbonate. The mixture is sterilized at 100° C. for 30 minutes. The pH value is then adjusted to a pH of 7.0 by the addition of sodium hydroxide solution.

The resulting culture medium is cooled and inoculated with 20 l. of a dense suspension of *Lactobacillus casei* which has been grown on whey with the addition of molasses residue in submersed culture. The inoculated medium is slowly stirred in a fermenter of 400 l. capacity at 30° C. for 20 minutes without aeration at which time the lactic acid fermentation is completed.

0.5 of cobaltous nitrate are added to the mixture which is then inoculated with a 48 hours old culture of *Propionibacterium freudenreichii*. After 3 to 4 days, bacterial growth and formation of vitamin $B_{12}$ by the Propionibacterium are completed. The culture is discharged and is carefully evaporated to dryness after addition of 300 g. of sodium sulfite. A valuable animal feed supplement is obtained.

The process described in this example according to which lactic acid fermentation proceeds propionic acid fermentation results in a considerable increase in the yield of vitamin $B_{12}$.

*Example 3*

25 kg. of comminuted *Aspergillus niger* mycelium, 250 l. of molasses residue from the production of citric acid obtained by filtering off the citric acid in the form of its calcium salt, 50 l. of skimmed milk or any other suitable source of protein and carbohydrates, such as soybean meal or whey powder, 0.5 kg. of diammonium phosphate, 2.5 kg. of calcium carbonate, and 200 l. of water are sterilized by boiling. The resulting mixture is inoculated with a culture of a strain of *Streptococcus lactis* capable of forming nisin (Mattick, A.T.R., and Hirsch, A., "Nature" (London), vol. 154 (1944), p. 551; Hirsch, A., "J. Gen. Microb"; vol. 5 (1951), p. 208). After *Streptococcus lactis* cultivation is completed, the fermenter is inoculated with 25 l. of a culture of *Propionibacterium freudenreichii*. The inoculated mixture is allowed to ferment for 3 to 4 days. The culture is then dried and yields a feed supplement with antibiotic and vitamin $B_{12}$ activity. Because of its content of propionic acid, lactic acid, and nisin, this product is especially suitable as a silaging agent. It has the special advantage of suppressing the growth of butyric acid bacteria and increasing the valuable vitamin $B_{12}$ content of the ensilage.

*Example 4*

100 l. of molasses residue from the fermentative production of citric acid as obtained on filtering off the citric acid in the form of calcium citrate, are mixed with 0.1% of ammonium phosphate and 0.5% of calcium carbonate. The mixture is sterilized in a suitable fermenter. After cooling to about 30° C., 5% of washed and comminuted mold mycelium from the citric acid fermentation are added to the mixture without further sterilization. If necessary, the pH value of the mixture is adjusted to a pH of 6.5 by the addition of milk of lime or sulfuric acid and the resulting culture medium is inoculated with 10 l. of a standing culture of propionic acid bacteria. The inoculated medium is then fermented at a temperature of 25–30° C. under anaerobic conditions for 3 to 4 days while stirring slowly. The entire fermentation liquid is evaporated and dried under mild conditions. About 10 kg. of a dry product containing vitamin $B_{12}$ are obtained which products represent a feed supplement with excellent growth promoting properties.

In place of mycelium from the citric acid fermentation there can also be used the fungus mycelium from the gluconic acid and the fumaric acid fermentation and likewise the mycelium obtained in the production of antibiotics, both types giving substantially the same favorable results. Likewise, in place of a standing culture there can also be used a culture obtained by stirring or shaking.

*Example 5*

90 l. of a molasses residue of the specific gravity of 1.04 containing 1.2% of invert sugar and 10 kg. of comminuted *Aspergillus niger* mycelium obtained on citric acid fermentation are mixed with 100 g. of diammonium phosphate, 0.8 g. of cobaltous chloride, and 500 g. of calcium carbonate. After adjusting the pH value to a pH of 7.5 by the addition of sodium hydroxide solution, the nutrient medium is sterilized by heating to a temperature of 100° C. in a fermenter for one hour. The fermenter of a capacity of 150 l. is provided with a stirrer rotating at 60 revolutions per minute. The sterilized medium is then cooled to 30° C. and inoculated with 10 l. of a 48 hours-old culture of *Propionibacterium shermanii* under sterile conditions. Growth and vitamin $B_{12}$ formation by the Propionibacterium takes place at 30° C. while stirring slowly. After 4 days the culture medium contains 2.3 mg. of vitamin $B_{12}$ per liter. The culture is dried slowly under mild conditions (maximum temperature 70° C.) and yields 10 kg. of a growth promoting feed supplement which contains about 20 mg. of vitamin $B_{12}$ perk kg.

Other culture media may be prepared as follows and may be used for the cultivation of other microorganisms.

Example 6

50 kg. of fresh, still moist mycelium obtained on citric acid fermentation on molasses are mixed with 50 l. of the mother liquor obtained on said fermentation. The mixture is mechanically disintegrated and sterilized. The resulting mycelium pulp is introduced into a fermenter and inoculated with 10 l. of a shaking culture of *Streptomyces olivaceus*. After a period of 2 to 4 days, during which the temperature is maintained at 25° C. to 30° C., cultivation is terminated. The resulting mycelium is dried on a roller dryer and is finely ground. About 13 kg. of a brownish product are obtained which, due to its contents of growth-promoting active substances (vitamins, enzymes, and the like), represent an excellent animal feed.

Example 7

20 kg. of the mycelium from submersed gluconic acid fermentation which is freed of most of its water by pressing are mixed with 30 l. of molasses slops in a closed vessel provided with a slow-speed vane agitator and the mixture is heat-sterilized therein. The cooled, thickly-liquid mixture is inoculated with 5 l. of a suspension of *Streptomyces griseus* grown in submersed culture. The cultivation is effected at a temperature of 28° C. to 30° C. for 24 hours to 28 hours while stirred continuously and gently aerating the culture. The resulting mycelium is discharged and dried. 7 kg. of dry material with a moisture content of 5% are obtained, which can be used as feed supplement or can further be treated to isolate therefrom its valuable constituents.

Example 8

4 kg. of washed mycelium from citric acid fermentation are mixed with 20 l. of molasses slurries from citric acid fermentation after calcium citrate has been removed therefrom by precipitation. The dry solid content of said molasses slurries is about 10%. 80 mg. of cobaltous nitrate and water are added to a volume of 40 l. The resulting mixture is sterilized. Its pH-value is adjusted to a pH of 6.0 to 7.0 by the addition of sodium hydroxide solution. The cooled culture medium is then inoculated with 4 l. of a submersed culture of *Streptomyces olivaceus*. Cultivation of the inoculating material was effected in a shaking culture using the same mycelium-molasses slurry medium. The inoculated culture medium is aerated with 600 l. of air per hour at 30° C. in a fermenter while stirring continuously. After 3 days to 4 days the resulting culture is discharged and carefully dried. About 2.5 kg. of dry product are obtained with a vitamin $B_{12}$ content of $10\gamma$ to $30\gamma$ per g. This product can be used as growth-promoting feed supplement or can be worked up to isolate the valuable components contained therein.

Cytolysis of the mycelium may be effected, for instance, as follows:

Example 9

50 kg. of moist *Aspergillus niger* mycelium obtained on submersed citric acid fermentation with a dry weight of about 11 kg. are inoculated with 5 l. of a suspension of Torula yeast obtained in submersed culture and mixed with 35 l. of water in a rotating fermenter. After rotating the fermenter for 24 hours at a temperature of 30° C. to 35° C., the cytolyzed thickly liquid mycelium is removed from the fermenter. By this treatment about 40% of the dry substance of the mycelium is converted into water-soluble form. In place of Torula yeast, there can be used other microorganisms, such as *Streptomyces olivaceus* or *Penicillin claviforme*.

Example 10

200 l. of molasses slurries from the fermentative production of alcohol, yeast, or citric acid are mixed with 10 kg. of calcium carbonate and 2 g. of cobaltous chloride. The mixture is sterilized, brought to a pH of 5.0 and fermented for 3 to 4 days at 35° C. after inoculation with *Streptomyces olivaceus*. The final mash with a dry substance content of about 5%, about half of which is protein, contains about 1 mg. of vitamin $B_{12}$ per l. and represents a valuable animal feed material.

Example 11

1000 kg. of mycelium from the production of citric acid from which part of the culture liquid has been squeezed off and which has been thermolyzed by sterilization, 500 kg. of molasses slurries, 80 l. of molasses, and the required amounts of nutritive salts and other ingredients are sterilized and fermented, after inoculation with *Streptomyces olivaceus*. The culture is worked up as described in Example 10.

Example 12

The culture medium described in Examples 1 and 2 is used for the cultivation of *Bacillus megatherium*. Thereby the added amount of molasses is increased to 100 l. The resulting culture represents also a valuable animal feed material.

Example 13

The runoff of the methane fermentation of molasses are sterilized and used in place of the molasses slurries of the preceding examples as nutrient medium for promoting fermentation. The slurry formed during methane fermentation is autolyzed or thermolyzed and can be admixed to the runoffs.

As stated above, the nutrient medium according to the present invention has proved to be of value not only in the cultivation of *Streptomyces olivaceus*, *Bacillus magatherium*, and Propionibacteria but also in the cultivation of all other microorganisms which are capable of producing vitamin $B_{12}$. Such microorganisms are, for instance, the following:

> *Trichotecium roseum*,
> *Methanobacterium omelianski*,
> *Flavobacterium devorans*,
> Bacteria of the genus Pseudomonas,
> *Propionibacterium arabinosum*,
> *Streptomyces fradiae*,
> *Streptomyces rimosus*,
> *Nocardia rugosa*,
> And others.

Thereby the procedure is the same as described in the preceding examples.

In place of the mold mycelium used in the preparation of the nutrient medium according to the preceding examples, there may be employed the growths or crops obtained on cultivating other microorganisms, and more particularly of fission fungi, especially bacteria, Actinomycetes, and Hyphomycetes, for instance, of

*Bacillus acidilactici* used in the biosynthetic preparation of lactic acid;

Butylogenic bacteria used in the biosynthetic preparation of butanol, acetone, isopropanol, and ethanol;
Bacteria of the genus Pseudomonas used in the preparation of keto gluconic acid;
Leuconostoc mesenteroides used in the preparation of dextran;
Bacillus acidipropionici used in the preparation of propionic acid;
Molds of the genera Mucor and Rhizopus used in the industrial biosynthetic manufacture of fumaric acid;
Molds of the genus Rhizopus used in the production of lactic acid;
Gibberella fujikuroi used in the biosynthetic production of gibberellic acid;
Bacillus subtilis used in the production of bacitracin;
Bacteria of the genus Escherichia used in the production of the antibiotic colicine;
And others.

Thereby, the procedure is the same as described in the preceding examples.

It must be pointed out, however, that yeast is not suitable for the process according to the present invention as it does not form a mycelium like molds do. As has been found, the enzyme systems present in yeast are only capable of producing ethanol and carbon dioxide as metabolic products but are unable to produce complicated metabolic products, such as vitamin $B_{12}$ and antibiotics.

In place of the molasses residues used in the preceding examples and mentioned hereinabove, there may be employed other molasses residues such as the molasses slops, slurries, runoffs, or the like residues of the biosynthetic production of antibiotics, of acids such as glucoheptonic acid, succinic acid, itaconic acid, of butanol-acetone-isopropanol, of fats and proteins, and the like. Otherwise the procedure is the same as described in the preceding examples.

As is evident from the preceding examples, molasses slops, runoffs, or the like residues, alone may be used as nutrient medium for the cultivation of microorganisms capable of producing vitamin $B_{12}$ and/or antibiotics.

Likewise, fungal mycelium or the growths or crops of non-yeastlike microorganisms, preferably after they have been subjected to a treatment whereby their cell contents are released, for instance, to thermolysis, autolysis, and the like, can also be used alone without further addition as nutrient agent for said purpose.

The preferred nutrient medium according to the present invention, however, is the mixture of molasses slops, slurries, runoffs, and the like, and pretreated fungal mycelium or pretreated growth or crops of non-yeastlike microorganisms.

As stated above, the nutrient medium according to the present invention can also be employed in the cultivation of microorganisms which are capable of producing antibiotica.

The following examples serve to illustrate the use of the nutrient medium according to the present invention in the cultivation of other microorganisms than those mentioned in the preceding examples. They also serve to illustrate other nutrient media to be used in said examples.

Example 14

200 l. of molasses slurries from the fermentative production of alcohol, yeast, or citric acid are mixed with 10 kg. of calcium carbonate and 2 g. of cobaltous chloride. The mixture is sterilized, brought to a pH of 5.0, and fermented for 3 to 4 days at 35° C. after inoculation with *Streptomyces griseus* variatio *farinosus*. The fermented mash with a dry substance content of about 5% contains 1 mg. of vitamin $B_{12}$ per liter and the antibiotic mixture of Streptothricine, streptoline A, and the factor $X_2$ of Peterson.

Example 15

200 l. of molasses slurries from the fermentative production of alcohol, yeast, or citric acid are mixed with 10 kg. of calcium carbonate and 2 g. of cobaltous chloride. The mixture is sterilized, brought to a pH of 5.0, and fermented for 3 to 4 days at 35° C. after inoculation with *Flavobacterium solare*. The final mash with a dry substance content of about 5%, about half of which is protein, contains about 0.6 mg. of vitamin $B_{12}$ per l. and represents a valuable animal feed material.

Example 16

200 l. of molasses slurries from the fermentative production of alcohol, yeast, or citric acid are mixed with 10 kg. of calcium carbonate and 2 g. of cobaltous chloride. The mixture is sterilized, brought to a pH of 5.0, and fermented for 3 to 4 days at 35° C. after inoculation with *Streptomyces vitaminicus*. The final mash with a dry substance content of about 5%, about half of which is protein, contains about 0.8 mg. of vitamin $B_{12}$ per l. and represents a valuable animal feed material.

Example 17

200 l. of molasses slurries from the fermentative production of alcohol, yeast, or citric acid are mixed with 10 kg. of calcium carbonate and 2 g. of cobaltous chloride. The mixture is sterilized, brought to a pH of 5,0 and fermented for 3 to 4 days at 35° C. after inoculation with *Actinoplanes subtropicales*. The final mash with a dry substance content of about 5%, about half of which is protein, contains about 2.0 mg. of vitamin $B_{12}$ per l. and represents a valuable animal feed material.

Example 18

400 kg. of the mycelium of *Gibberella fujikuroi* are separated from the nutrient broth by filtration by means of a rotary vacuum filter. The filtered mycelium is mixed with 8000 l. of molasses slops obtained from lactic acid fermentation. The pH-value of the mixture is adjusted to a pH of 7.5 by the addition of milk of lime (calcium hydroxide). 80 kg. of calcium carbonate (about 1% of the medium) are added to buffer the acid formed during fermentation. The nutrient solution is sterilized at 100° C. for one hour while stirring slowly. After cooling to 30° C. the medium is pumped into a fermenter provided with a slow stirrer and is inoculated with 2,000 l. of a 24-hour old culture of *Propionibacterium shermanii* from an intermediate fermenter.

This inoculated material was obtained from three successive fermentation steps of 20 l., 200 l., and 2,000 l. The nutrient solution in the prefermenters and the intermediate fermenter differs from that of the production cultivation step only by a lower content of calcium carbonate, i.e., by a calcium carbonate content of 0.2%. Cultivation of the propionic acid bacteria requires 24 hours in each step whereupon the fermentation medium is transferred to the next-larger stirring vessel under sterile conditions.

In the production fermenter of a capacity of 12 cu. m. the fermentation solution is agitated at slow speed. The speed of stirring is preferably between 30 revolutions per minute and 60 revolutions per minute so that about 6 mg. of oxygen are absorbed by one liter of culture liquid per hour. The pH-value decreases to a pH of 5.5 during cultivation and fermentation. After 96 hours the fermentation liquid together with the bacteria cells contain 1.2 mg. of vitamin $B_{12}$ per liter.

The entire cultivation mixture is then concentrated by evaporation in a vacuum at a temperature of 70° C. to sirupy consistency and is finally evaporated to dryness by spray drying in a drying tower. 1,200 kg. of a powder containing 10 mg. of vitamin $B_{12}$ per kg. are obtained. This product can be used as a growth-promoting feed supplement.

Example 19

400 kg. of the mycelium of *Streptomyces griseus* obtained on filtering off the culture broth of the biosynthetic production of streptomycin by means of pressure filters are mixed with 8000 l. of molasses slops obtained on butanol-acetone fermentation. The procedure is otherwise the same as described hereinabove in Example 1 and the yield of vitamin $B_{12}$ is also approximately the same.

Example 20

8000 l. of molasses slurry of the citric acid fermentation which contains about 10% of dry solids and about 1.2% of invert sugar are adjusted to a pH of 7.5 by the addition of calcium hydroxide in the form of milk of lime. 80 kg. of calcium carbonate are admixed thereto and the mixture is sterilized at 100° C. for one hour while stirring slowly. 400 kg. of untreated mycelium of *Aspergillus niger* obtained from the gluconic acid fermentation are added thereto. The resulting mixture is cooled to 30° C. and pumped into a fermenter provided with a "slow" stirrer. 2000 l. of a 24 hour-old culture of *Propionibacterium shermanii* are added to inoculate the culture medium prepared with untreated mycelium. Fermentation and working up of the culture is effected by following the procedure described in Example 1.

Example 21

10,000 l. of the molasses slops obtained on butanol-acetone fermentation and containing about 2% of the dry substance of *Clostridium acetobutylicum*, about 1% of nitrogen-containing substances, and about 1% of nitrogen-free substances are adjusted to a pH of 7.5 by the addition of calcium hydroxide. 80 kg. of calcium carbonate are added and the nutrient medium is sterilized at 100° C. for one hour. Subsequent cooling, inoculation with 2000 l. of a 24 hour-old culture of *Propionibacterium shermanii* and working up of the culture is effected by following the procedure described in Example 1.

Example 22

In place of the molasses slurries employed in Example 21, there are used 10,000 l. of the molasses slops obtained on lactic acid fermentation of a dry substance content of about 7% of which about 2% are the dry substance of *Lactobacillus delbruecki*. Otherwise the procedure is followed as described in said Example 21 and in Example 1.

Example 23

10,000 l. of the molasses slops obtained on gibberellic acid fermentation which contains about 1.5% of dry substance of *Gibberella fujikuroi* are adjusted, by the addition of calcium hydroxide, to a pH of 7.0. 80 kg. of calcium carbonate are added and the culture medium is sterilized at 100° C. for one hour. Otherwise the procedure is followed as described in Examples 21 and 1.

Example 24

The pasty mycelium of *Rhizopus nigricans* obtained on large scale fumaric acid fermentation is heated with steam in a vessel to 45° C. Said temperature is maintained for 48 hours to complete autolysis. 250 cc. of concentrated sulfuric acid diluted with water to a volume of about 2 l. are added to each 100 l. of autolysate. The mixture is sterilized. 400 kg. of said hydrolyzed autolysate are mixed with 8000 l. of molasses slops. Otherwise the procedure is followed as described in Examples 21 and 1.

Example 25

The mycelium of *Streptomyces griseus* obtained from 4000 l. of the culture liquid from the bio-synthesis of streptomycin is filtered off by means of pressure filters and is heated in a thermolyzing vessel at 80° C. for 4 hours to complete thermolysis. After cooling, the thermolyzed mycelium is preferably diluted with water and used as nutrient medium for the biosynthetic production of vitamin $B_{12}$, as described in the preceding examples.

Example 26

In place of the ground mycelium of *Aspergillus niger* obtained on citric acid fermentation by surface cultivation as used in Example 1, there is employed the mycelium of *Aspergillus niger* obtained on citric acid fermentation by submersed fermentation. Such a mycelium is obtained in the form of finely divided pellets and, therefore, does not need to be comminuted before use in the claimed process. Otherwise, the procedure is followed as described in Example 1.

Example 27

A mycelium of *Aspergillus niger* obtained on submersed citric acid fermentation is used in the process described in Example 1 which is obtained by separating the mycelium, after fermentation and citric acid formation are completed, from the culture. The molasses slop employed is obtained by adding milk of lime to the filtrate obtained after filtering off the mycelium and precipitating from the thus treated filtrate, the citric acid in the form of calcium citrate. After removing the calcium citrate, the remaining liquid represents the molasses slops used as nutrient in the process according to the present invention. This liquid is not only free of mycelium but also of citric acid. Otherwise the procedure is followed as described in Example 1.

The terms "molasses slops," "molasses slurries," "residual liquor from molasses fermentation processes," "distillers wash from molasses fermentation processes," "molasses residues from the production of citric acid," and the like indicate all those molasses residues remaining in fermentation processes using molasses as nutrient. Such molasses residues may still contain the mold mycelium or the growth of other non-yeastlike microorganisms. Such molasses slops are obtained, for instance, by distilling off the fermentation products. They may also be freed from the mycelium or the growth of the microorganism by filtration, centrifuging, settling, or the like. These molasses liquids or runoffs may also be used in the process according to the present invention. It is evident that all residual liquors from fermentation processes wherein molasses was used as nutrient, can be used according to the present invention, thus eliminating the burdensome disposition of such waste products and of utilizing their nutrient values for the production of highly valuable products such as vitamin $B_{12}$ and/or antibiotics.

It is understood that although culture media according to the present invention containing molasses slops, runoffs, or the like molasses residues from fermentation processes using molasses as one of the nutrients, or the mycelium or growth obtained on cultivating non-yeastlike microorganisms, preferably in the autolyzed, thermolyzed, plasmolyzed, cytolyzed, or hydrolyzed state, or, preferably, molasses slops and mycelium or microorganisms in combination can be used in the cultivation of various types and species of microorganisms, such culture media have proved to be especially useful in the cultivation of vitamin $B_{12}$-forming species of the genus Propionibacterium and that especially large amounts of vitamin $B_{12}$ are formed on such an inexpensive medium composed of waste materials.

Of course, many changes and variations in the composition and source of the molasses slops, slurries, runoffs, or the like residues from molasses fermentation, in the composition and source of the mold mycelium or the growth or crops of other non-yeastlike microorganisms, in the fission fungi, molds, actinomycetes, and hyphomycetes cultivated on such media, in the pretreatment of the mycelium or growth, in the addition of other nutrients, trace elements, precursors, and the like to such nutrient media, in the preparation, sterilization, pH-adjustment, and the like of such media, in the methods of working up and recovering the metabolic products from the result-

We claim:

1. In a process of microbiologically producing vitamin $B_{12}$, the steps which comprise mixing the molasses residue from molasses fermentation processes with a microorganism product selected from the group consisting of mold mycelium, the growth of bacteria, and their autolysates, thermolysates, plasmolysates, cytolysates, and hydrolysates, adjusting the pH-value of the resulting mixture to a pH between about 5.5 and about 7.0, sterilizing the resulting nutrient medium, inoculating the medium with a culture of Propionibacteria, and cultivating said Propionibacteria under substantially anaerobic conditions on said nutrient medium at a temperature between about 25° C. and about 35° C. until substantially no more vitamin $B_{12}$ is formed.

2. The process according to claim 1, wherein the Propionibacterium is a Propionibacterium selected from the group consisting of *Propionibacterium freudenreichii, Propionibacterium shermanii, Propionibacterium zeae, Propionibacterium peterssonii,* and *Propionibacterium pentosaceum*.

3. In a process of cultivating vitamin $B_{12}$-producing microorganisms, the steps which comprise mixing the molasses residue from molasses fermentation processes with a microorganism product selected from the group consisting of mold mycelium, the growth of bacteria, and their autolysates, thermolysates, plasmolysates, cytolysates, and hydrolysates, adjusting the pH-value of the resulting mixture to a pH between about 5.5 and about 7.0, sterilizing the resulting nutrient medium, inoculating the medium with a culture of *Lactobacillus casei*, cultivating said *Lactobacillus casei* on said nutrient medium to cause lactic acid fermentation, inoculating the resulting lactic acid fermentation culture with a culture of Propionibacteria, and cultivating said Propionibacteria on said culture at a temperature between about 25° C. and about 35° C. until substantially no more vitamin $B_{12}$ is formed.

4. In a process of cultivating vitamin $B_{12}$ producing microorganisms, the steps which comprise mixing the molasses residue from molasses fermentation processes with a microorganism product selected from the group consisting of mold mycelium, the growth of bacteria, and their autolysates, thermolysates, plasmolysates, cytolysates, and hydrolysates, adjusting the pH-value of the resulting mixture to a pH between about 5.5 and about 7.0, sterilizing the resulting nutrient medium, inoculating the medium with a culture of a nisin- and lactic acid-forming microorganism to cause lactic acid fermentation and nisin formation, inoculating the resulting lactic acid fermentation culture with a culture of Propionibacteria, and cultivating said Propionibacteria on said culture at a temperature between about 25° C. and about 35° C. until substantially no more vitamin $B_{12}$ is formed.

5. In a process of cultivating vitamin $B_{12}$-producing microorganisms and antibiotic-producing microorganisms, the steps which comprise mixing the molasses residue from molasses fermentation processes with a microorganism product selected from the group consisting of mold mycelium, the growth of bacteria, and their autolysates, thermolysates, plasmolysates, cytolysates, and hydrolysates, adjusting the pH-value of the resulting mixture to a pH between about 5.5 and about 7.0, sterilizing the resulting mixture, inoculating the mixture with a culture of *Streptomyces olivaceous*, and cultivating said microorganism on said mixture at a temperature between about 25° C. and about 35° C.

References Cited in the file of this patent

UNITED STATES PATENTS

| | | |
|---|---|---|
| 2,394,031 | Waksman et al. | Feb. 5, 1946 |
| 2,492,667 | Snell et al. | Dec. 27, 1949 |
| 2,492,673 | Woodward et al. | Dec. 27, 1949 |
| 2,576,932 | Garibaldi et al. | Dec. 4, 1951 |
| 2,595,159 | Meyer et al. | Aug. 29, 1952 |
| 2,643,213 | Hall | June 23, 1953 |
| 2,674,561 | Moyer | Apr. 6, 1954 |
| 2,739,923 | Martin | Mar. 27, 1956 |
| 2,816,856 | Sudansky et al. | Dec. 17, 1957 |
| 2,943,983 | Bernhauer | July 5, 1960 |